(12) United States Patent
Balmakhtar et al.

(10) Patent No.: US 9,912,693 B1
(45) Date of Patent: Mar. 6, 2018

(54) IDENTIFICATION OF MALICIOUS PRECISE TIME PROTOCOL (PTP) NODES

(71) Applicant: Sprint Communications Company L.P., Overland Park, KS (US)

(72) Inventors: Marouane Balmakhtar, Alexandria, VA (US); Khoi Dinh Nguyen, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 88 days.

(21) Appl. No.: 14/679,173

(22) Filed: Apr. 6, 2015

(51) Int. Cl.
| | |
|---|---|
| *G06F 11/30* | (2006.01) |
| *G06F 21/56* | (2013.01) |
| *H04L 29/06* | (2006.01) |
| *H04J 3/06* | (2006.01) |
| *G06F 1/12* | (2006.01) |
| *G06F 21/50* | (2013.01) |

(Continued)

(52) U.S. Cl.
CPC .......... *H04L 63/1466* (2013.01); *G06F 1/12* (2013.01); *G06F 11/30* (2013.01); *G06F 21/50* (2013.01); *G06F 21/552* (2013.01); *G06F 21/56* (2013.01); *G06N 99/005* (2013.01); *H04J 3/0638* (2013.01); *H04L 63/1425* (2013.01)

(58) Field of Classification Search
CPC ... H04L 63/1466; H04L 63/1425; G06F 1/12; G06F 11/30; G06F 21/50; G06F 21/552; G06F 21/56; G06N 99/005; H04J 3/0638
See application file for complete search history.

(56) References Cited

U.S. PATENT DOCUMENTS

| | | | |
|---|---|---|---|
| 5,673,004 A | * | 9/1997 | Park .......................... H03L 7/08 327/156 |
| 8,204,083 B2 | | 6/2012 | Lai et al. |
| 8,417,934 B2 | | 4/2013 | Kondapalli et al. |

(Continued)

FOREIGN PATENT DOCUMENTS

| | | |
|---|---|---|
| CN | 102801733 | 11/2012 |
| CN | 103051486 | 4/2013 |

(Continued)

OTHER PUBLICATIONS

Sun, Kun, Peng Ning, and Cliff Wang. "Secure and resilient clock synchronization in wireless sensor networks." IEEE Journal on Selected Areas in Communications 24.2 (2006): 395-408.*

(Continued)

*Primary Examiner* — Michael Simitoski

(57) ABSTRACT

A server system generates and transfers Precision Time Protocol (PTP) synch requests for delivery to a PTP clock server and responsively receives PTP synch responses transferred by the PTP clock server. The server system processes the PTP synch responses to determine PTP clock phase error data for the PTP clock server. The server system compares the PTP clock phase error data to a historical phase error threshold for the PTP clock server. If the PTP clock phase error data does not exceed the historical phase error threshold, then the server system updates the historical phase error threshold for the PTP clock server based on the PTP clock phase error data. If the PTP clock phase error data exceeds the historical phase error threshold, then the server system generates an indication that the PTP clock server comprises a malicious PTP node.

20 Claims, 9 Drawing Sheets

(51) Int. Cl.
*G06F 21/55* (2013.01)
*G06N 99/00* (2010.01)

(56) References Cited

U.S. PATENT DOCUMENTS

| | | | |
|---|---|---|---|
| 8,515,069 B2 | 8/2013 | Kuo et al. | |
| 8,909,509 B2 | 12/2014 | Maturana et al. | |
| 9,361,198 B1* | 6/2016 | Popovici | G06F 21/56 |
| 2002/0186802 A1* | 12/2002 | Morgan | H03L 7/091 |
| | | | 375/355 |
| 2004/0158759 A1* | 8/2004 | Chang | G06F 1/06 |
| | | | 713/500 |
| 2004/0254904 A1* | 12/2004 | Nelken | G06F 17/2705 |
| | | | 706/50 |
| 2007/0260906 A1* | 11/2007 | Corredoura | G06F 1/12 |
| | | | 713/400 |
| 2013/0223496 A1* | 8/2013 | Buhl | H04L 1/205 |
| | | | 375/224 |
| 2013/0235888 A1* | 9/2013 | Bui | H04J 3/0641 |
| | | | 370/503 |
| 2013/0279525 A1* | 10/2013 | Zheng | H04J 3/0667 |
| | | | 370/516 |
| 2014/0247185 A1* | 9/2014 | Achanta | G01S 19/20 |
| | | | 342/357.58 |
| 2014/0250972 A1 | 9/2014 | Achanta et al. | |
| 2015/0067794 A1* | 3/2015 | Blakely | H04L 63/0846 |
| | | | 726/5 |
| 2015/0236807 A1* | 8/2015 | Mizrahi | H04J 3/0641 |
| | | | 370/503 |
| 2015/0326332 A1* | 11/2015 | Chen | H04J 3/0644 |
| | | | 370/503 |
| 2015/0356451 A1* | 12/2015 | Gupta | G06N 99/005 |
| | | | 706/52 |
| 2017/0118242 A1* | 4/2017 | Georgescu | H04L 63/1458 |

FOREIGN PATENT DOCUMENTS

| | | |
|---|---|---|
| CN | 103378993 | 10/2013 |
| WO | 2013159486 | 10/2013 |

OTHER PUBLICATIONS

Hu, Y-C., Adrian Perrig, and David B. Johnson. "Packet leashes: a defense against wormhole attacks in wireless networks." INFOCOM 2003. Twenty-Second Annual Joint Conference of the IEEE Computer and Communications. IEEE Societies. vol. 3. IEEE, 2003.*

Kügler, Dennis. ""Man in the Middle" Attacks on Bluetooth." International Conference on Financial Cryptography. Springer Berlin Heidelberg, 2003.*

Levi, Albert, et al. "Relay attacks on bluetooth authentication and solutions." International Symposium on Computer and Information Sciences. Springer Berlin Heidelberg, 2004.*

Zenner, Erik. "On the efficiency of the clock control guessing attack." International Conference on Information Security and Cryptology. Springer Berlin Heidelberg, 2002.*

* cited by examiner

IDENTIFICATION OF MALICIOUS PRECISE TIME PROTOCOL (PTP) NODES

TECHNICAL BACKGROUND

Server systems include time controls which provide user equipment access to synchronization timing data. Server systems exchange synchronization timing data between user equipment and master clocks using Internet Protocol (IP) packets. IP packets include hardware time stamps indicating clock frequency, phase, and time origin.

Mobile networks use Time Division Multiplex (TDM) signals, Global Positioning System (GPS) or Global Navigation Satellite System (GLONASS), and Synchronous Ethernet (SynchE) and Precision Time Protocol (PTP) to perform synchronization. For those networks that require alignment to the same frequency, phase, and time origin, PTP is typically used. PTP is based on the provision of timing through the packet network, which is typically the most cost-effective solution.

Many wireless networks are deployed in public locations which make them more vulnerable to hacking attempts. A malicious node may try to hack a network and provide receiving slave nodes with false synchronization data by impersonating a master node. When a malicious node impersonates a master clock, slave nodes need to be able to determine that the master node is now a malicious node and end synchronization or use an alternative master node to perform time synchronization. Packet information in the synch messages can help detect anomalies due to possible hacking attempts. If malicious nodes are not detected early, synchronization for fundamental mobile services may fail.

TECHNICAL OVERVIEW

A server system generates and transfers Precision Time Protocol (PTP) synch requests for delivery to a PTP clock server and responsively receives PTP synch responses transferred by the PTP clock server. The server system processes the PTP synch responses to determine PTP clock phase error data for the PTP clock server. The server system compares the PTP clock phase error data to a historical phase error threshold for the PTP clock server. If the PTP clock phase error data does not exceed the historical phase error threshold, then the server system updates the historical phase error threshold for the PTP clock server based on the PTP clock phase error data. If the PTP clock phase error data exceeds the historical phase error threshold, then the server system generates an indication that the PTP clock server comprises a malicious PTP node.

DETAILED DESCRIPTION

Figure 1:
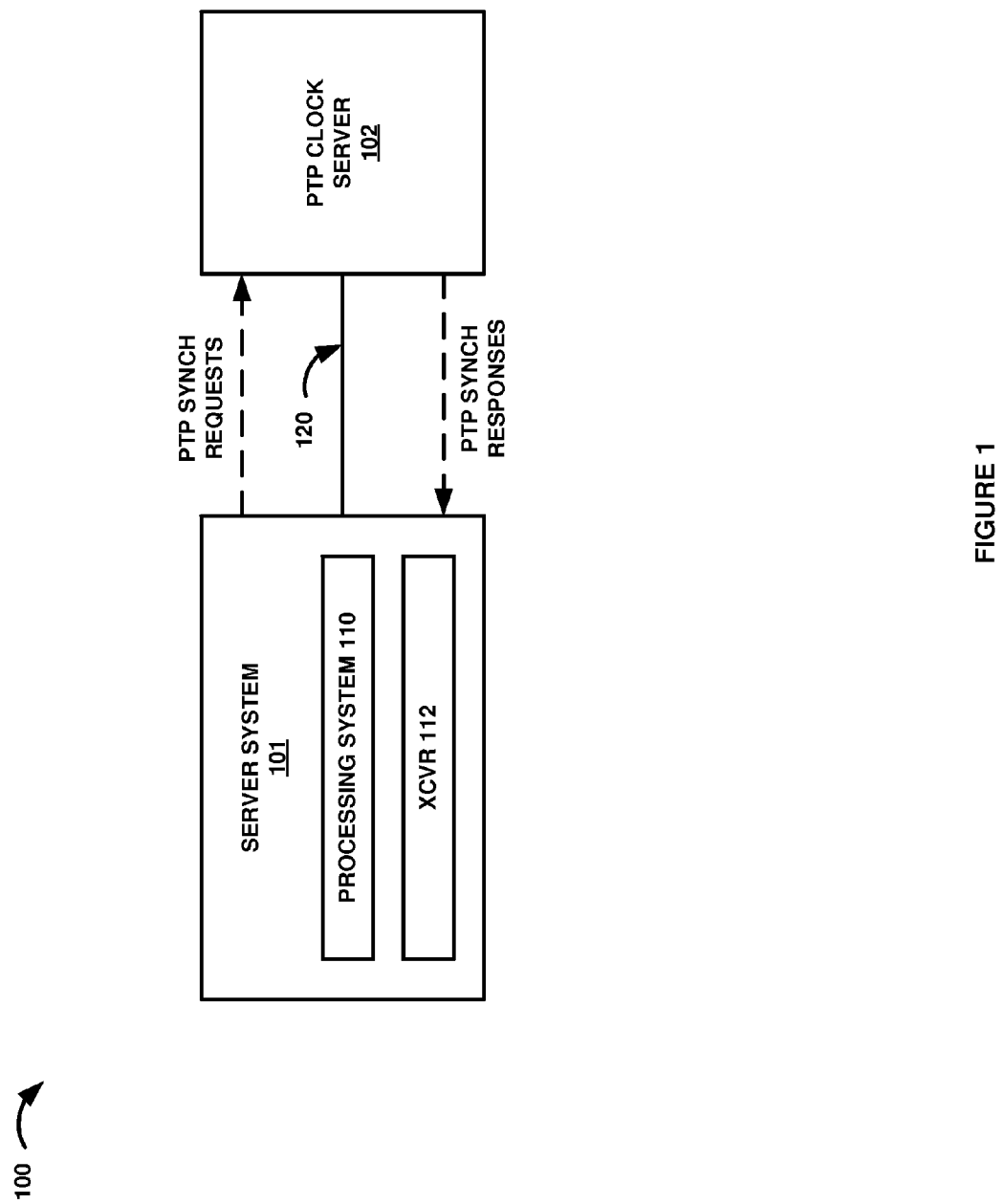
FIGS. 1-3 illustrate a data communication system to identify malicious PTP nodes.

FIG. 1 illustrates data communication system 100. Data communication system 100 includes server system 101, PTP clock server 102, and communication link 120. Server system 101 includes processing system 110 and communication transceiver 112. Server system 101 and PTP clock server 102 communicate over communication link 120.

Server system 101 comprises one or more network elements that provide communication services to communication devices. Server system 101 bridges synchronization from one segment to another. Server system 101 may receive synchronization data from a master clock or may transmit synchronization data to user equipment, such as wireless devices, base stations, or other server systems. Server system 101 may reside in a single device or may be distributed across multiple devices. Server system 101 may comprise switches, wireless access nodes, Internet routers, network gateways, application servers, computer systems, communication links, or some other type of communication network element—including combinations thereof.

PTP clock server 102 comprises one or more network elements that provide PTP data to server system 101. PTP clock server 102 comprises memory, software, processing circuitry, cabling, power supply, network communication interface, structural support, or some other communication apparatus. PTP clock server 102 may be a switch, wireless access node, Internet router, network gateway, application server, computer system, communication link, or some other type of communication network element—including combinations thereof.

Communication link 120 uses metal, glass, air, space, or some other material as transport media. Communication link 120 could be a direct link or may include intermediate networks, systems, or devices. Communication link 120 may use PTP or various other protocols, such as Ethernet, Long Term Evolution (LTE), Wireless Fidelity (WIFI), or some other communication format—including combinations thereof.

In operation, server system 101 generates and transfers PTP synch requests for delivery to PTP clock server 102. PTP synch requests include time stamps that allow server system 101 and PTP clock server 102 to measure PTP clock phase error data. In response to generating and transferring PTP synch requests, server system 101 receives PTP synch responses transferred by PTP clock server 102. PTP synch responses include time stamps and correction data that allow server system 101 to correct PTP clock phase error data.

In a next operation, server system 101 processes the PTP synch responses to determine PTP clock phase error data for PTP clock server 102. PTP clock phase error data includes deviations in phase, frequency, time, or some other PTP clock phase error data for PTP clock server 102, such as synch packet jitter, synch packet loss, or synch packet latency—including combinations thereof. Server system 101 then compares the PTP clock phase error data to a historical phase error threshold for PTP clock server 102. Historical phase error data includes previous deviations in phase, frequency, time, or some other previous PTP clock phase error data for PTP clock server 102, such as synch packet jitter, synch packet loss, or synch packet latency—including combinations thereof.

If the PTP clock phase error data does not exceed the historical phase error threshold, then server system 101 updates the historical phase error threshold for PTP clock server 102 based on the PTP clock phase error data. PTP clock phase error data that does not exceed the historical phase error threshold typically indicates that PTP clock server 102 is not a malicious node. Therefore, the PTP phase error data originating from PTP clock server 102 is likely to be authentic and may be used to update the historical phase error threshold for PTP clock server 102.

If the PTP clock phase error data exceeds the historical phase error threshold, then server system 101 generates an indication that PTP clock server 120 comprises a malicious PTP node. PTP clock phase error data that exceeds the historical phase error threshold may indicate that PTP clock server 102 is a malicious node which has hacked the network and is impersonating PTP clock server 102. Therefore, the PTP clock phase error data would not be added to the historical phase error threshold and server system 101 may indicate a hacking alert to a user or other server systems, end signaling with the malicious node, or find an alternative PTP clock server to perform clock synchronization. For example, if the PTP phase error threshold containing data from previous PTP synch responses indicates a synch packet jitter of no more than one nanosecond, a synch packet jitter of over one nanosecond may indicate that PTP clock server 102 may not be the same clock or may not be in the same location. Therefore, there is a reasonable likelihood that the PTP synch response was transferred by a malicious node and not by the authentic PTP clock server 102.

In some examples, the PTP clock phase error data comprises phase deviation from a master PTP clock. In other examples, the PTP clock phase error data comprises a stability of the phase deviation from a master PTP clock. In some examples, the PTP clock phase error data comprises Maximum Time Interval Error (MTIE). For example, server system 101 may calculate the maximum round trip tracking delay time of both the PTP synch request and the PTP synch response. In other examples, the PTP clock phase error data comprises Time Deviation (TDEV). For example, server system 101 may calculate the consistency of frequency offset over time, although other reference timing signals may be used to calculate and compare PTP clock phase error data, such as minimum average phase error, as maximum average phase error, and as median average phase errors. In other examples, the PTP clock phase error data comprises both MTIE and TDEV.

In some examples, server system 101 processes the PTP synch responses to determine PTP clock frequency error data for PTP clock server 102, and compares the PTP clock frequency error data to a historical frequency error threshold for PTP clock server 102. Frequency error may be the difference in frequency of server system 101 and PTP clock server 102 after adjustment for the time offset effect produced during transmittal of the PTP synch request and PTP synch response. In this example, if the PTP clock frequency error data does not exceed the historical frequency error threshold, then server system 101 updates the historical frequency error threshold for PTP clock server 102 based on the PTP frequency error data. In this example, if the PTP clock frequency error data exceeds the historical frequency error threshold, then server system 101 generates an indication that PTP clock server 102 comprises a malicious PTP node.

In some examples, server system 101 processes the PTP synch responses to determine synch packet jitter for PTP clock server 102, and compares the synch packet jitter to a historical synch packet jitter threshold for PTP clock server 102. Synch packet jitter may be the deviation from the presumed packet delivery time of either the PTP synch request or the PTP synch response, or both. In this example, if the synch packet jitter does not exceed the historical synch packet jitter threshold, then server system 101 updates the historical synch packet jitter threshold for PTP clock server 102 based on the synch packet jitter. In this example, if the synch packet jitter exceeds the historical synch packet jitter threshold, then server system 101 generates an indication that PTP clock server 102 comprises a malicious PTP node.

In some examples, server system 101 processes the PTP synch responses to determine synch packet loss for PTP clock server 102, and compares the synch packet loss to a historical synch packet loss threshold for PTP clock server 102. Packet loss may be the number of occurrences in which a packet is of data traveling across a network fails to reach the destination. Packet loss may be the number of occurrences in which the PTP synch response fails to reach PTP clock server 102 or the number of occurrences in which the PTP synch response fails to reach server system 101, or both. In this example, if the synch packet loss does not exceed the historical synch packet loss threshold, then server system 101 updates the historical synch packet loss threshold for PTP clock server 102 based on the synch packet loss. In this example, if the synch packet loss exceeds the historical synch packet loss threshold, then server system 101 generates an indication that PTP clock server 102 comprises a malicious PTP node.

In some examples, server system 101 processes the PTP synch responses to determine synch packet latency for PTP clock server 120, and compares the synch packet latency to a historical synch packet latency threshold for PTP clock server 120. Synch packet latency may be the delay in packet delivery due to limited velocity the packet can travel with physical interactions in the system. Synch packet latency may be the delay in the PTP synch response reaching PTP clock server 102 or the delay in the PTP synch response reaching server system 101, or both. In this example, if the synch packet latency does not exceed the historical synch packet latency, then server system 101 updates the historical synch packet latency threshold for PTP clock server 102 based on the synch packet latency. In this example, if the synch packet latency exceeds the historical synch packet latency threshold, then server system 101 generates an indication that PTP clock server 102 comprises a malicious PTP node.

Figure 2:
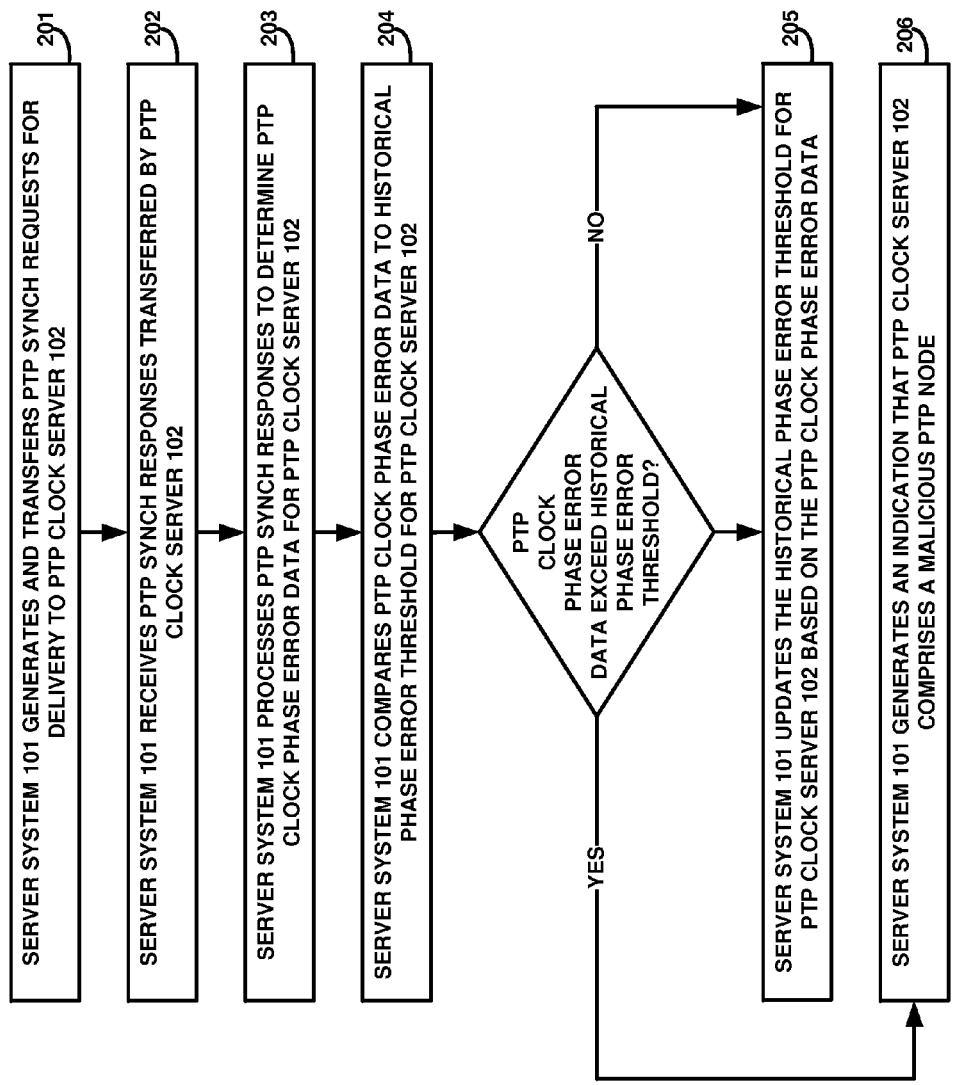

FIG. 2 is a flow diagram illustrating an operation of server system 100 to identify malicious PTP nodes. Server system 101 generates and transfers (201) PTP synch requests for delivery to PTP clock server 102. Server system 101 responsively receives (202) PTP synch responses transferred by PTP clock server 102. Server system 101 processes (203) the PTP synch responses to determine PTP clock phase error data for PTP clock server 102. Server system 101 compares (204) PTP clock phase error data to historical phase error threshold for PTP clock server 102. If the PTP clock phase error data does not exceed the historical phase error threshold, then server system 101 updates (205) the historical phase error threshold for PTP clock server 102 based on the PTP clock phase error data. If the PTP clock phase error data exceeds the historical phase error threshold, then server system 101 generates (206) an indication that PTP clock server 102 comprises a malicious PTP node.

Figure 3:
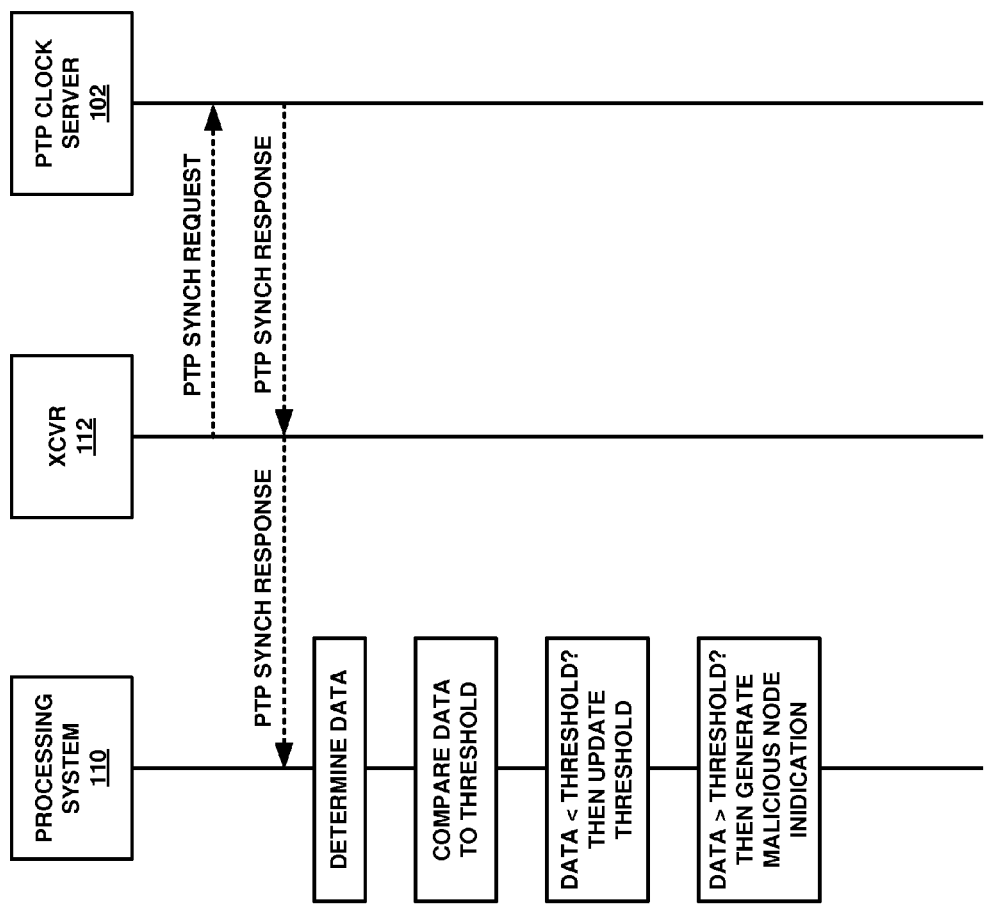

FIG. 3 is a sequence diagram illustrating the operation of data communication system 100 to identify malicious PTP nodes. In this embodiment, communication transceiver 112 transfers a PTP synch requests for delivery to PTP clock server 102. In response, communication transceiver 112 receives PTP synch responses transferred by PTP clock server 102. Communication transceiver 112 then transfers the PTP synch responses to processing system 110. In response to receiving the PTP synch responses from communication transceiver 112, processing system 110 processing the PTP synch responses to determine PTP clock phase error data for PTP clock server 102. Processing system 110 then compares the PTP clock phase error data to a historical phase error threshold for PTP clock server 102. If the PTP clock phase error data does not exceed the historical phase error threshold, then processing system 110 updates the historical phase error threshold for PTP clock server 102 based on the PTP clock phase error data. If the PTP clock phase error data exceeds the historical phase error threshold, then processing system 110 generates an indication that PTP clock server 102 comprises a malicious PTP node.

Figure 4:
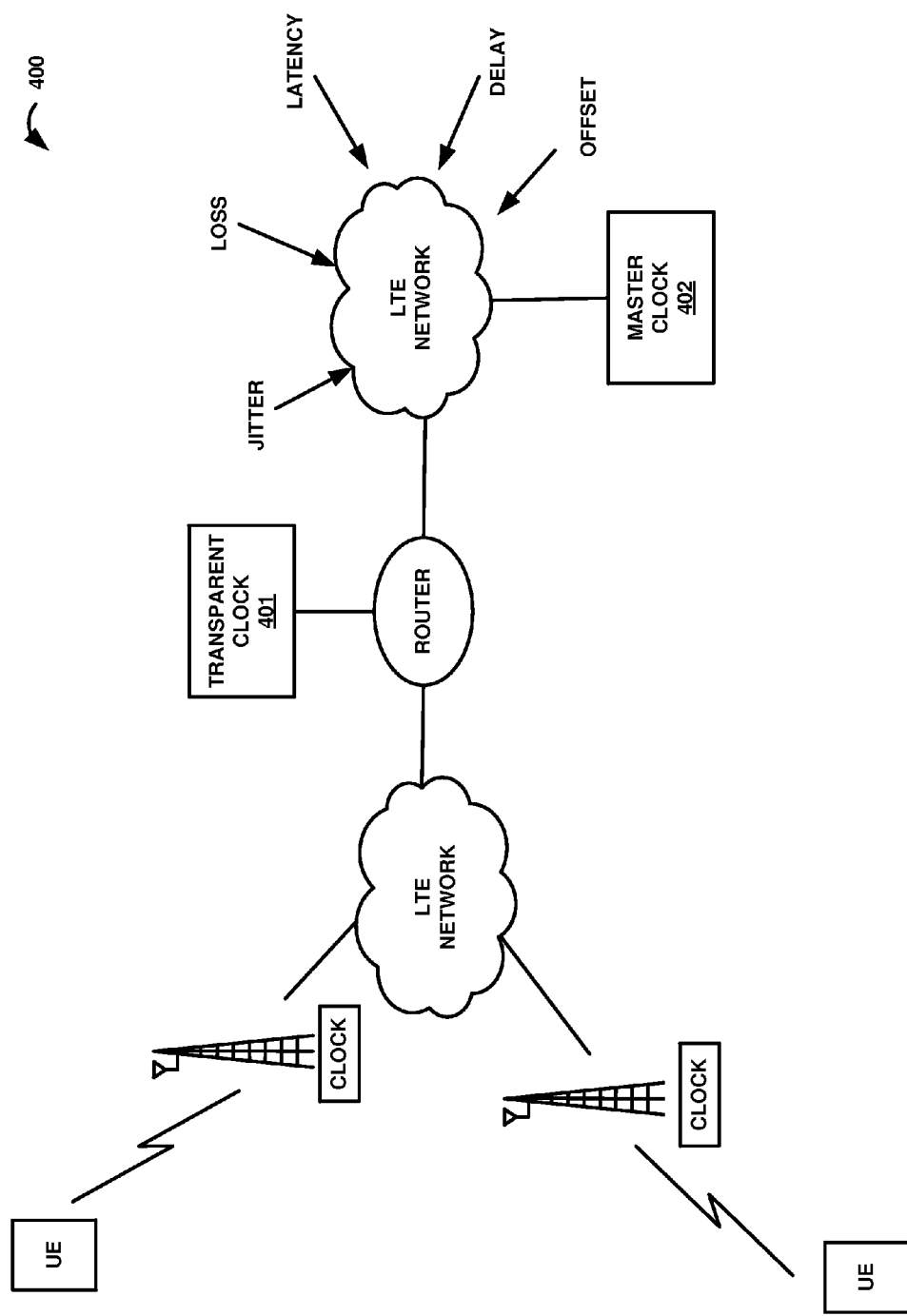
FIGS. 4-5 illustrate a transparent clock to identify malicious PTP nodes.

FIG. 4 illustrates data communication system 400 to identify malicious PTP nodes. Data communication system 400 is an example of data communication system 100, although data communication system 100 may use alternative configurations and operations. Data communication system includes transparent clock 401, master clock 402, LTE networks, base stations, and user equipment (UE). Base stations may be femtocells, small cells, or some other node apparatus. Base stations include slave clocks which receive time synchronization data and transfer time synchronization data to UEs. Master clock 402 is an example of PTP clock server 102, although PTP clock server 102 may use alternative configurations and operations. Transparent clock 401 is an example of server system 101, although server system 101 may use alternative configurations and operations. Transparent clock 401 bridges synchronization from master clock 402 to base station clocks and UEs by synchronizing to master clock 402, performing time corrections, and then transferring synchronization data downstream to base station clocks and UEs. PTP clock phase error may occur due to phase delay, frequency offset, synch packet jitter, synch packet loss, synch packet latency, or some other PTP clock phase error—including combinations thereof.

Figure 5:
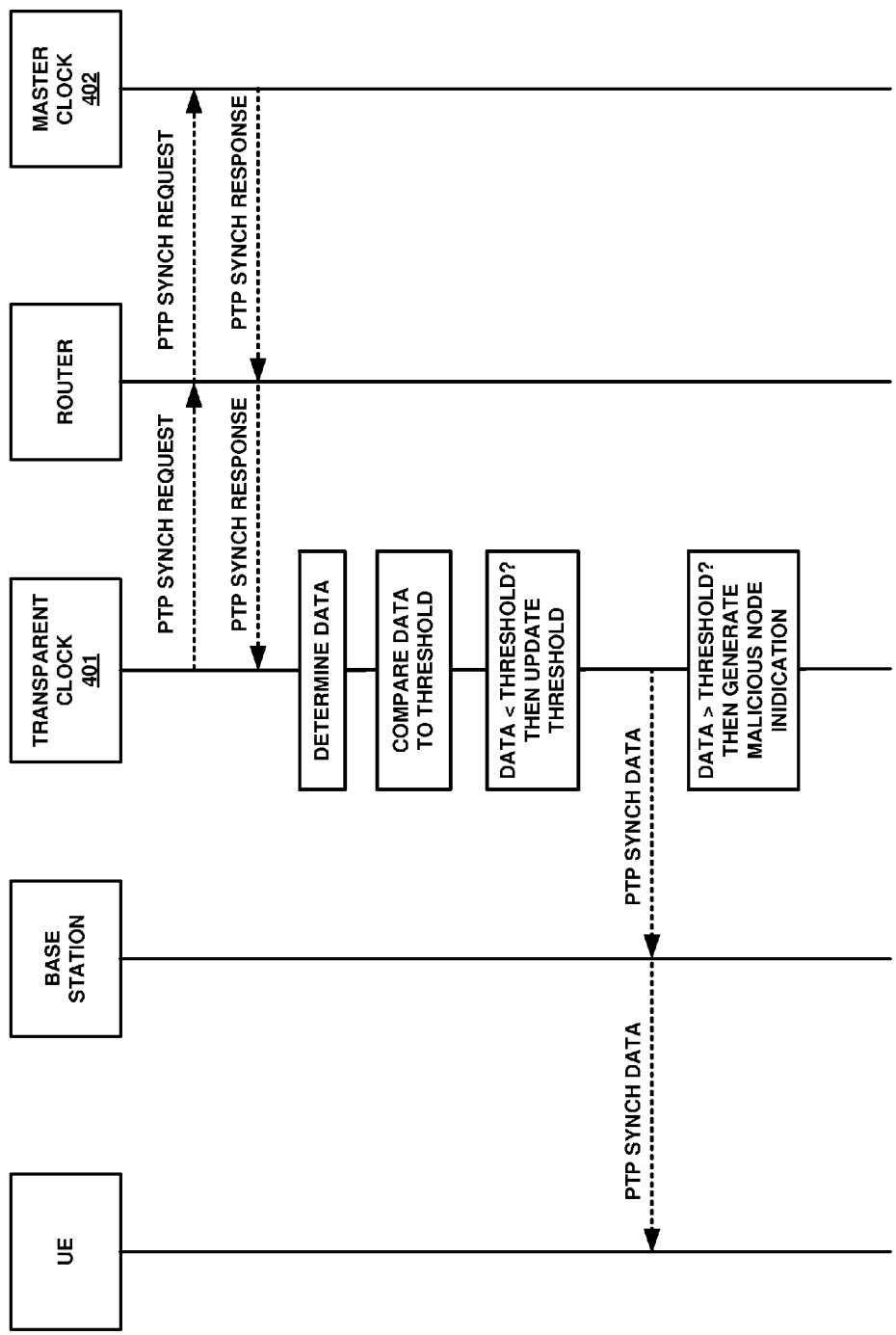

FIG. 5 illustrates an operation of data communication system 400 to identify malicious nodes. In this embodiment, transparent clock 401 transfers a PTP synch request to master clock 402 through router. In response to the PTP synch request, master clock 402 transfers a PTP synch response to transparent clock 401 through router. Transparent clock 401 then processing the PTP synch responses to determine PTP clock phase error data for master clock 402. The PTP clock phase error data may include phase delay, frequency offset, synch packet jitter, synch packet loss, synch packet latency, or some other PTP clock phase error—including combinations thereof. Transparent clock 401 then compares the PTP clock phase error data to a historical phase error threshold for master clock 402.

Still referring to FIG. 5, if the PTP clock phase error data does not exceed the historical phase error threshold, then transparent clock 401 updates the historical phase error threshold for master clock 402 based on the PTP clock phase error data. Transparent clock 401 then transfers PTP synch data to UE through the base station. If the PTP clock phase error data exceeds the historical phase error threshold, then transparent clock 401 generates an indication that master clock 402 comprises a malicious PTP node. Although not indicated in FIG. 5, if it is indicated that master clock 402 comprises a malicious PTP node, transparent clock 401 may also terminate synchronization with master clock 402 and begin PTP synchronization with an alternative master clock. In most cases, the termination of synchronization between transparent clock 401 and master clock 402, and the initiation of synchronization with an alternative master clock would not be indicated to the UEs downstream from transparent clock 401.

Figure 6:
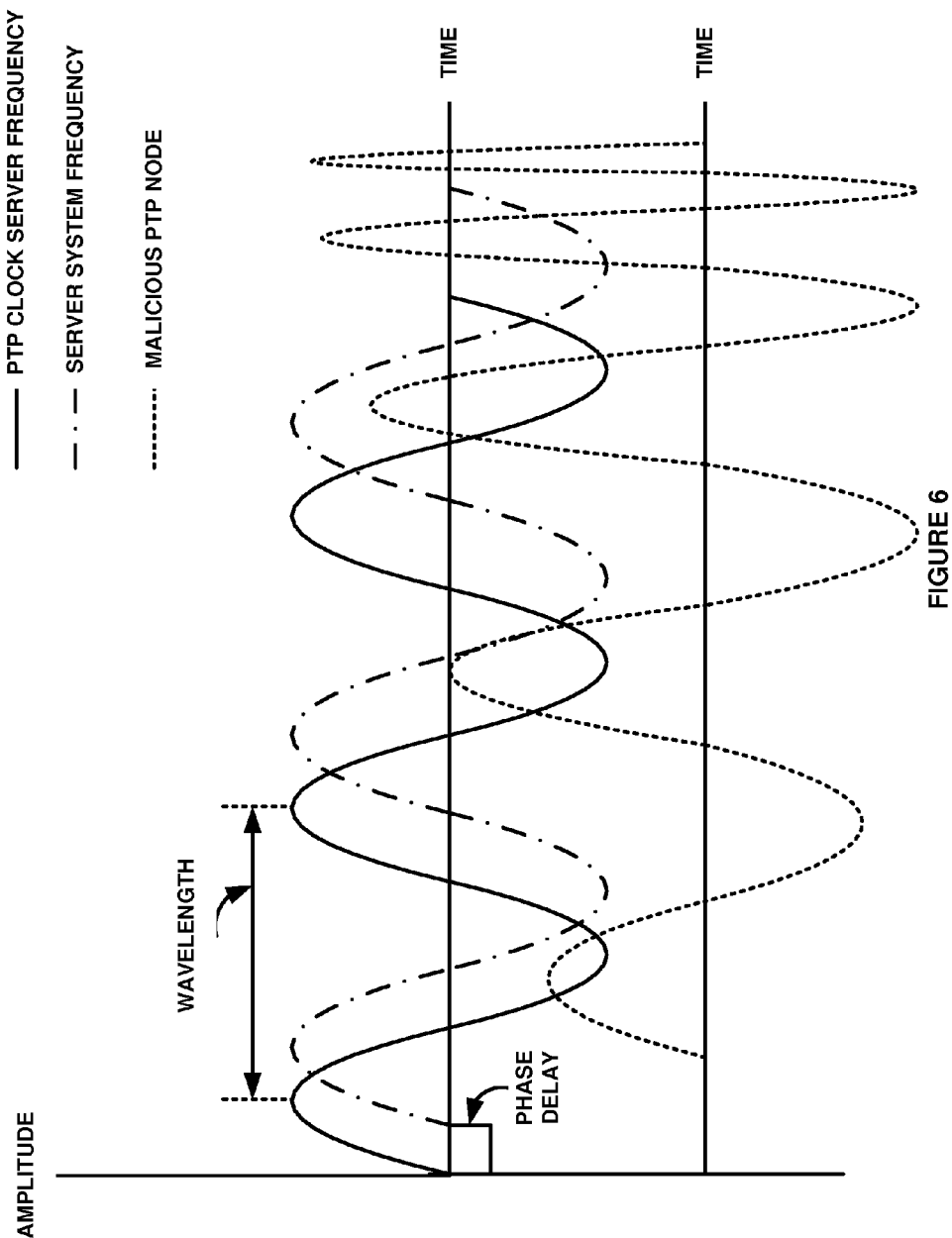
FIG. 6 illustrates a graph of PTP phase delay and frequency offset.

FIG. 6 illustrates a graph of PTP phase delay and frequency offset to identify malicious PTP nodes. As indicated on the graph, phase delay is the time between when the PTP clock server frequency cycle begins and when the server system frequency cycle begins. Frequency offset, is the difference in the PTP clock server frequency cycle wavelength and the server system frequency cycle wavelength. It should be noted that other factors indicated in the PTP clock phase error data occur during transfer of PTP synch packets, such as synch packet jitter, synch packet loss, synch packet latency, or other packet transfer factors.

Still referring to FIG. 6, the PTP clock server frequency and the server system frequency are not identical in phase and frequency. As illustrated on the graph, the server system frequency contains a normal phase delay and frequency offset. However, as indicated on the graph, the malicious PTP node frequency has a phase delay and frequency offset that are outside a normal range of frequency error variation. In addition, the frequency offset tends to drift further from the PTP clock server frequency and server system frequency as time goes on. It should be noted that the malicious PTP node frequency variation has been exaggerated for illustrative purposes and that there likely could be a phase delay and frequency offset that more closely resembles the PTP clock server frequency, but is still not within a normal range of frequency error variation.

Figure 7:
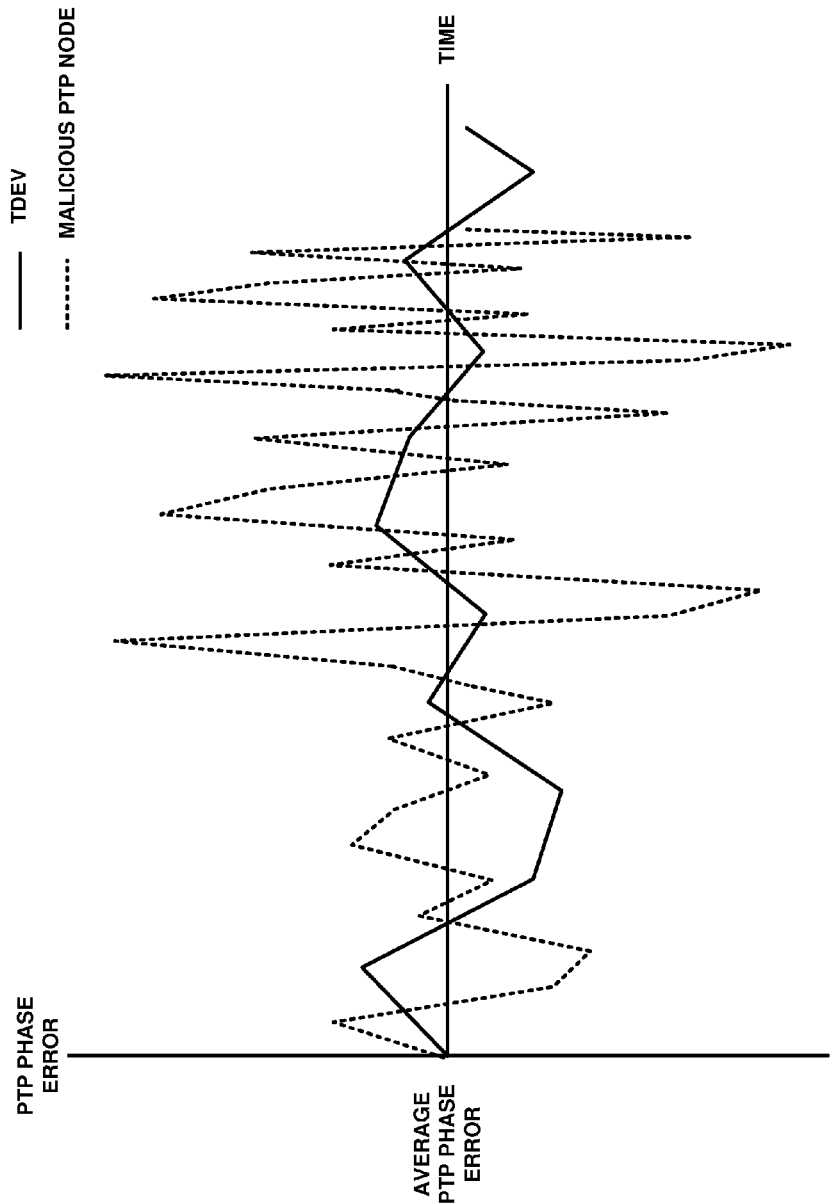
FIGS. 7-8 illustrate graphs of Maximum Time Interval Error (MTIE) and Time Deviation (TDEV) to determine PTP clock phase error data to identify malicious PTP nodes.

FIG. 7 illustrates a graph of Time Deviation (TDEV) to determine PTP clock phase error data to identify malicious PTP nodes. TDEV is the measurement of PTP phase error stability over time. In this example embodiment, if the server system determines that a PTP clock server phase error from a PTP synch response is beyond the TDEV threshold, it may be a malicious node and should be indicated. As shown on the graph, the malicious PTP node frequency variation has been exaggerated for illustrative purposes. It should be noted that other factors included in the PTP clock phase error data may include phase delay, frequency offset, synch packet jitter, synch packet loss, synch packet latency, or some other PTP clock phase error data—including combinations thereof.

Figure 8:
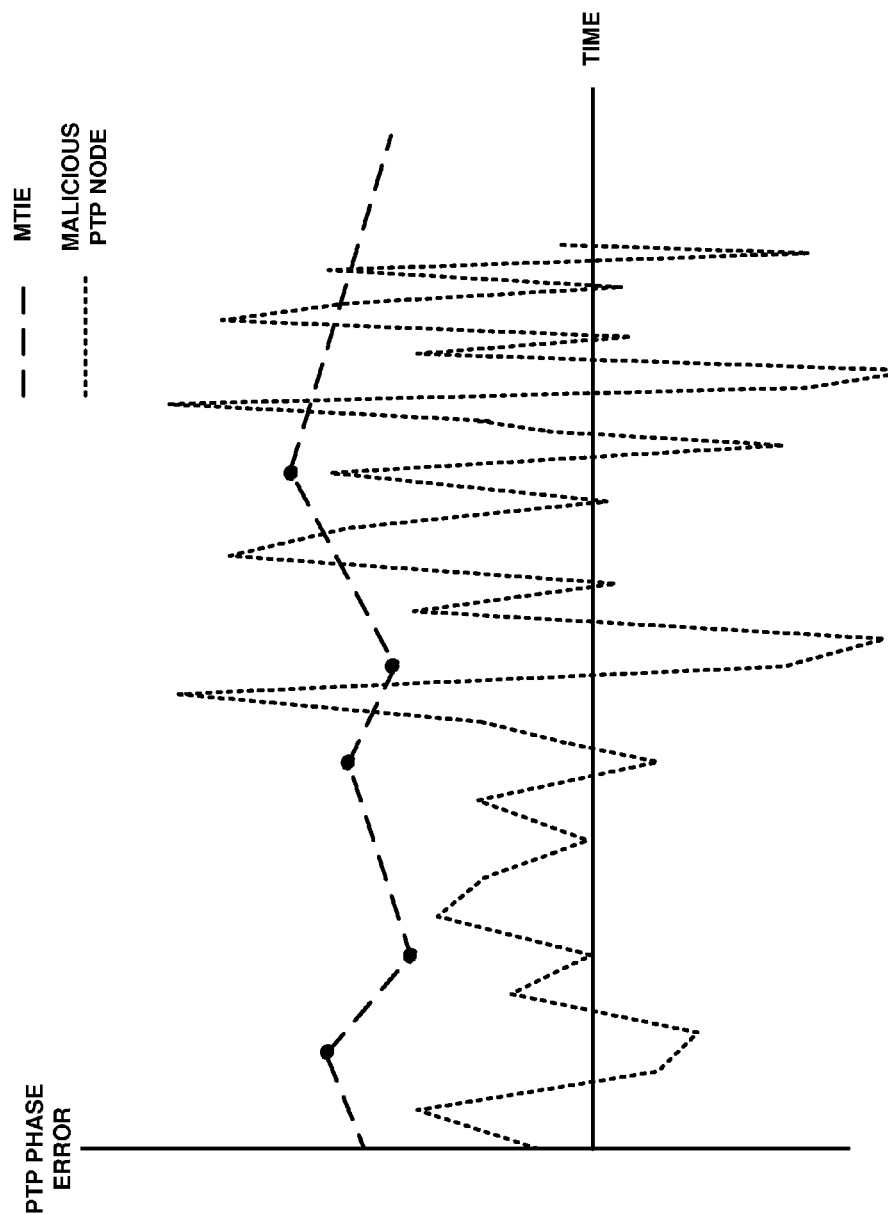

FIG. 8 illustrates a graph of Maximum Time Interval Error (MTIE) to determine PTP clock phase error data to identify malicious PTP nodes. MTIE is the measurement of the maximum PTP clock phase error from the average PTP clock phase error. In this example embodiment, if the server system determines that a PTP clock server phase error from a PTP synch response is beyond the MTIE threshold, it may be a malicious node and should be indicated. As shown on the graph, the malicious PTP node frequency variation has been exaggerated for illustrative purposes. It should be noted that other factors included in the PTP clock phase error data may include phase delay, frequency offset, synch packet jitter, synch packet loss, synch packet latency, or some other PTP clock phase error data—including combinations thereof.

Figure 9:
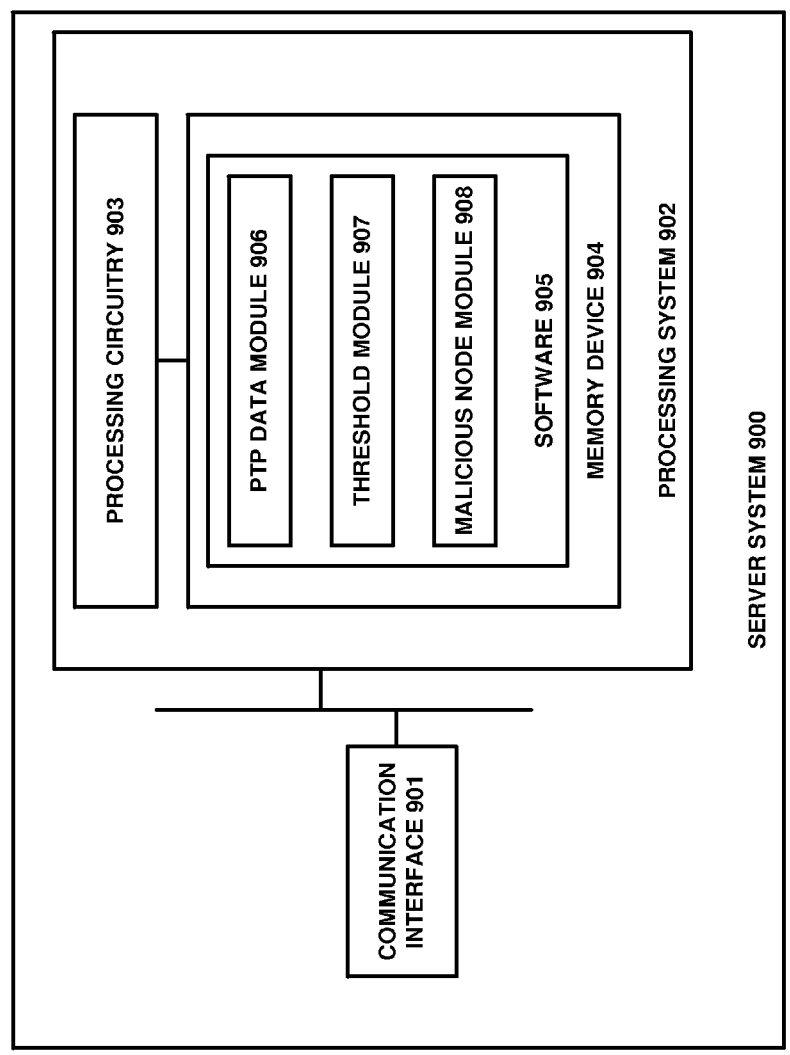
FIG. 9 illustrates a server system to identify malicious PTP nodes.

FIG. 9 illustrates server system 900 to identify malicious PTP nodes. Server system 900 is an example of server system 101 or transparent clock 401, although server system 101 or transparent clock 401 may use alternative configurations. Server system 900 comprises communication interface 901, and processing system 902. Processing system 902 is linked to communication interface 901. Processing system 902 includes processing circuitry 903 and memory device 904 that stores operating software 905. Software 905 includes software modules 906-908.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, communication signaling, or some other communication format—including combinations thereof. Communication interface 901 transfers PTP synch requests for delivery to a PTP clock server. Communication interface also receives PTP synch responses transferred by the PTP clock server.

Processing system 902 includes processing circuitry 903 and memory device 904 that stores software 905. Processing circuitry 903 comprises microprocessor and other circuitry that retrieves and executes operating software 905 from memory device 904. Memory device 904 comprises a non-transitory storage medium, such as a disk drive, flash drive, data storage circuitry, or some other memory apparatus. Operating software 905 comprises computer programs, firmware, or some other form of machine-readable processing instructions. Operating software 905 may include an operating system, utilities, drivers, network interfaces, applications, or some other type of software. Operating software 905 includes PTP data module 906, threshold module 907, and malicious node module 908. When executed by circuitry 903, operating software 905 directs processing system 902 to operate server system 900 as described herein.

In particular, when executed by processing circuitry 903, PTP data module 906 directs processing system 902 to process the PTP synch responses to determine PTP clock phase error data for the PTP clock server. When executed by processing circuitry 903, threshold module 907 directs processing system 902 to compare the PTP clock phase error data to a historical phase error threshold for the PTP clock server. When executed by processing circuitry 903, threshold module 907 also directs processing system 902 to update the historical phase error threshold for the PTP clock server based on the PTP clock phase error data, if the PTP clock phase error data does not exceed the historical phase error threshold. When executed by processing circuitry 903, malicious node module 908 directs processing system 902 to generate an indication that the PTP clock server comprises a malicious PTP node, if the PTP clock phase error data exceeds the historical phase error threshold.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

The invention claimed is:

1. A method of operating a server system to identify malicious Precision Time Protocol (PTP) nodes comprising:
    generating and transferring PTP synch requests for delivery to a master PTP clock and responsively receiving PTP synch responses transferred by the master PTP clock;
    processing the PTP synch responses to determine PTP clock phase error data for the master PTP clock;
    comparing the PTP clock phase error data to a historical phase error threshold for the master PTP clock, wherein the historical phase error threshold is based on previous phase error data;
    if the PTP clock phase error data does not exceed the historical phase error threshold, then updating the historical phase error threshold for the master PTP clock based on the PTP clock phase error data; and
    if the PTP clock phase error data exceeds the historical phase error threshold, then generating an indication that the master PTP clock comprises a malicious PTP node.

2. The method of claim 1 wherein the PTP clock phase error data comprises phase deviation from the master PTP clock.

3. The method of claim 1 wherein the PTP clock phase error data comprises a stability of a phase deviation from the master PTP clock.

4. The method of claim 1 wherein the PTP clock phase error data comprises Maximum Time Interval Error (MTIE).

5. The method of claim 1 wherein the PTP clock phase error data comprises Time Deviation (TDEV).

6. The method of claim 1 wherein the PTP clock phase error data comprises Maximum Time Interval Error (MTIE) and Time Deviation (TDEV).

7. The method of claim 1 further comprising:
    processing the PTP synch responses to determine PTP clock frequency error data for the master PTP clock;
    comparing the PTP clock frequency error data to a historical frequency error threshold for the master PTP clock;
    if the PTP clock frequency error data does not exceed the historical frequency error threshold, then updating the historical frequency error threshold for the master PTP clock based on the PTP frequency error data; and
    if the PTP clock frequency error data exceeds the historical frequency error threshold, then generating the indication that the master PTP clock comprises a malicious PTP node.

8. The method of claim 1 further comprising:
    processing the PTP synch responses to determine synch packet jitter for the master PTP clock;
    comparing the synch packet jitter to a historical synch packet jitter threshold for the master PTP clock;
    if the synch packet jitter does not exceed the historical synch packet jitter threshold, then updating the historical synch packet jitter threshold for the master PTP clock based on the synch packet jitter; and
    if the synch packet jitter exceeds the historical synch packet jitter threshold, then generating the indication that the master PTP clock comprises a malicious PTP node.

9. The method of claim 1 further comprising:
    processing the PTP synch responses to determine synch packet loss for the master PTP clock;
    comparing the synch packet loss to a historical synch packet loss threshold for the master PTP clock;
    if the synch packet loss does not exceed the historical synch packet loss threshold, then updating the historical synch packet loss threshold for the master PTP clock based on the synch packet loss; and
    if the synch packet loss exceeds the historical synch packet loss threshold, then generating the indication that the master PTP clock comprises a malicious PTP node.

10. The method of claim 1 further comprising:
    processing the PTP synch responses to determine synch packet latency for the master PTP clock;
    comparing the synch packet latency to a historical synch packet latency threshold for the master PTP clock;
    if the synch packet latency does not exceed the historical synch packet latency threshold, then updating the historical synch packet latency threshold for the master PTP clock based on the synch packet latency; and if the synch packet latency exceeds the historical synch packet latency threshold, then generating the indication that the master PTP clock comprises a malicious PTP node.

11. A server system to identify malicious Precision Time Protocol (PTP) nodes comprising:

a communication transceiver configured to transfer PTP synch requests for delivery to a master PTP clock and responsively receive PTP synch responses transferred by the master PTP clock; and a processing system, comprising a microprocessor and a memory, configured to process the PTP synch responses to determine PTP clock phase error data for the master PTP clock; compare the PTP clock phase error data to a historical phase error threshold for the master PTP clock; if the PTP clock phase error data does not exceed the historical phase error threshold, then update the historical phase error threshold for the master PTP clock based on the PTP clock phase error data; and if the PTP clock phase error data exceeds the historical phase error threshold, then generate an indication that the master PTP clock comprises a malicious PTP node, wherein the historical phase error threshold is based on previous phase error data.

12. The server system of claim 11 wherein the PTP clock phase error data comprises phase deviation from the master PTP clock.

13. The server system of claim 11 wherein the PTP clock phase error data comprises a stability of the phase deviation from the master PTP clock.

14. The server system of claim 11 wherein the PTP clock phase error data comprises Maximum Time Interval Error (MTIE).

15. The server system of claim 11 wherein the PTP clock phase error data comprises Time Deviation (TDEV).

16. The server system of claim 11 wherein the PTP clock phase error data comprises Maximum Time Interval Error (MTIE) and Time Deviation (TDEV).

17. The server system of claim 11 wherein the processing system is configured to process the PTP synch responses to determine PTP clock frequency error data for the master PTP clock, compare the PTP clock frequency error data to a historical frequency error threshold for the master PTP clock, if the PTP clock frequency error data does not exceed the historical frequency error threshold, then update the historical frequency error threshold for the master PTP clock based on the PTP frequency error data, and if the PTP clock frequency error data exceeds the historical frequency error threshold, then generate the indication that the master PTP clock comprises a malicious PTP node.

18. The server system of claim 11 wherein the processing system if configured to process the PTP synch responses to determine synch packet jitter for the master PTP clock, compare the synch packet jitter to a historical synch packet jitter threshold for the master PTP clock, if the synch packet jitter does not exceed the historical synch packet jitter threshold, then update the historical synch packet jitter threshold for the master PTP clock based on the synch packet jitter, and if the synch packet jitter exceeds the historical synch packet jitter threshold, then generate the indication that the master PTP clock comprises a malicious PTP node.

19. The server system of claim 11 wherein the processing system is configured to process the PTP synch responses to determine synch packet loss for the master PTP clock, compare the synch packet loss to a historical synch packet loss threshold for the master PTP clock, if the synch packet loss does not exceed the historical synch packet loss threshold, then update the historical synch packet loss threshold for the master PTP clock based on the synch packet loss, and if the synch packet loss exceeds the historical synch packet loss threshold, then generate the indication that the master PTP clock comprises a malicious PTP node.

20. The server system of claim 11 wherein the processing system is configured to process the PTP synch responses to determine synch packet latency for the master PTP clock, compare the synch packet latency to a historical synch packet latency threshold for the master PTP clock, if the synch packet latency does not exceed the historical synch packet latency threshold, then update the historical synch packet latency threshold for the master PTP clock based on the synch packet latency, and if the synch packet latency exceeds the historical synch packet latency threshold, then generate the indication that the master PTP clock comprises a malicious PTP node.

\* \* \* \* \*